United States Patent [19]

Brown et al.

[11] 3,946,146
[45] Mar. 23, 1976

[54] DISCRETE RINGING DETECTOR FOR USE IN KEY TELEPHONE SYSTEMS

[75] Inventors: Wallace G. Brown; Thomas C. Lloyd, both of Bloomington, Ill.

[73] Assignee: GTE Automatic Electric Laboratories Incorporated, Northlake, Ill.

[22] Filed: Jan. 17, 1975

[21] Appl. No.: 541,832

[52] U.S. Cl. ................................ 179/99; 179/84 R
[51] Int. Cl.² ................................ H04M 1/00
[58] Field of Search .......... 179/18 HB, 81 R, 81 A, 179/84 R, 84 A, 84 L, 99, 81 C, 81 L, 18 F, 18 FA, 18 BE, 27 F

[56] References Cited
UNITED STATES PATENTS

| | | |
|---|---|---|
| 2,187,499 | 1/1940 | Langer et al. ..................... 179/27 F |
| 2,753,403 | 7/1956 | Caracciolo ........................ 179/84 R |
| 3,176,082 | 3/1965 | Nilsson............................. 179/84 R |
| 3,653,018 | 3/1972 | Budrys .............................. 179/84 R |
| 3,816,670 | 6/1974 | Marshall ............................. 179/99 |

*Primary Examiner*—Thomas A. Robinson
*Attorney, Agent, or Firm*—Robert J. Black

[57] ABSTRACT

A circuit for use with key telephone systems for detecting the presence of either of two different distinctive ringing signals received over a telephone line. After detection a separate distinct visual signal is provided to indicate which of the two signals was received.

8 Claims, 3 Drawing Figures

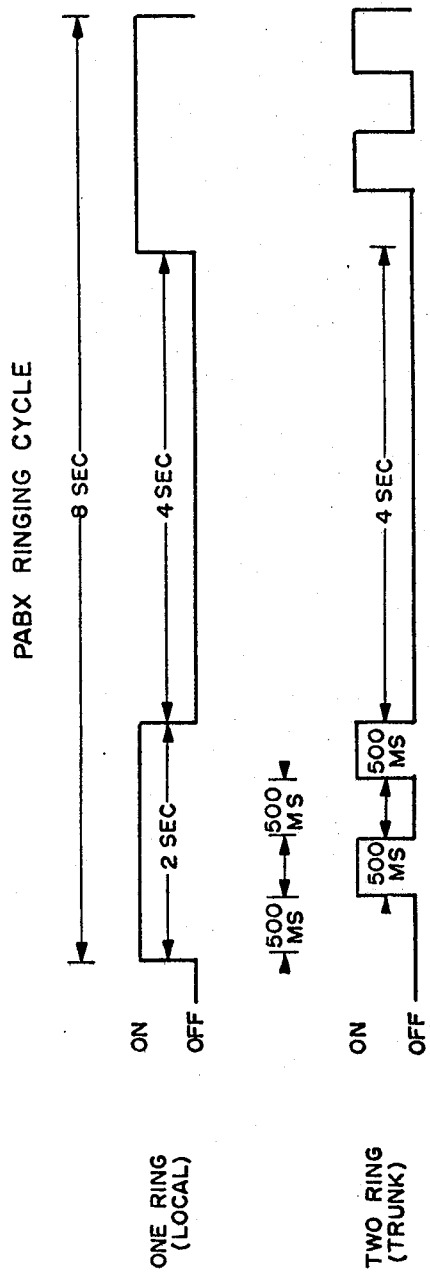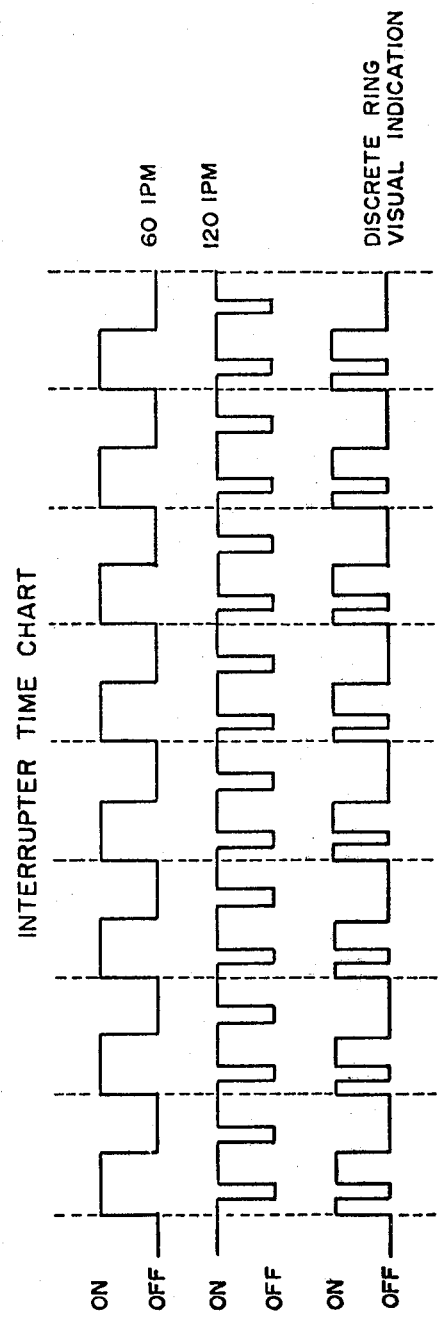

DISCRETE RINGING DETECTOR FOR USE IN KEY TELEPHONE SYSTEMS

BACKGROUND OF THE INVENTION

1. Field of the Invention

The present invention relates to key telephone systems and more particularly to a line circuit for use in key telephone systems, that includes means for detecting the presence of one or the other of two distinctively different ringing signals and in response to said detection provides at one or more associated key telephone subsets a visual signal distinctive only to the received signal.

2. Description of the Prior Art

Extensive use has been made in recent years of key telephone systems. Key telephone systems are customer controlled switching systems which conventionally provide access for a key telephone subset user to two or more telephone lines. Often several key telephone subsets are connected to a common group of two or more lines which are connectible to each of the key telephone subsets.

More recently key telephone systems have been employed in conjunction with large private automatic branch exchanges (PABX's) to provide a high degree of flexibility and convenience of telephoning service. For example in a large business many telephones may be provided as part of a private automatic branch exchange system, all of which may communicate with each other through an internally provided switching system which is operated by means of dial or push-button calling units associated with individual telephone subsets. Calls to and from an associated telephone central office are made and received through the locally provided switching equipment. In such a system it has been found expedient to include key telephone systems in addition to the private automatic branch exchange so that several telephone users in a common area or department may have access to a common group of lines in the branch exchange. In this manner each of the several users provided with key system service may make or answer telephone calls over any of the groups of lines dedicated to the key system.

A recent innovation in private automatic branch exchange service is the provision of inward calling. In inward calling each telephone line in the private automatic branch exchange may be dialed directly by central office subscribers through the private automatic branch exchange switching equipment, by the dialing of a number distinctive to the desired line.

When inward dialing service is provided the stations in the private automatic branch exchanges receive a distinctive ringing signal to indicate the presence of an inward dialed trunk call or a different distinctive signal to indicate the presence of a call originating from within the PABX. As long as the telephone subset connected to a PABX line in this arrangement is of the single line type, the local ringer included therein provides an audible indication of either of the distinctive tones received, so that the user can easily determine that the call originated locally or is an incoming central office call.

To date in PABX telephone systems with inward dialing it has been impossible to determine the nature of the incoming call at key telephone type subsets since typically such arrangements use a common signaling feature which prohibits the subset user from distinguishing a local intra-PABX call from an incoming trunk call. In such key telephone systems the line circuit conventionally converts all incoming ringings to a common visual and audible signal. The common audible signal once activated presents a single ring and typically a 60 impulse per minute signal to flash a lamp associated with the incoming line at each of the connected key telephone subsets. An example of a private automatic branch exchange useful for receiving inward dialed calls from a telephone central office as well as intra-PABX calls is the Type 311 Centrex PABX, manufactured by GTE Automatic Electric Incoporated. A key telephone system of the type which would be used with such a private automatic branch exchange is like that designated as a Type 10A2 Key Telephone System also manufactured by GTE Automatic Electric Incoporated. In the PABX referenced above a single ring of 2 second duration is provided for intra-PABX calls and two, ½ second rings separated by a ½ second period of silence, are provided on incoming trunk calls.

A suggested solution counted the one or two rings to provide identification of incoming calls. However since the PABX ringing singals are applied at random during the ringing cycle it would be possible to receive one ring of a two ring code and thus display an incorrect visual signal at a key telephone subset lamp. No other solutions are known to solve the problem presented in the system outlined above. Accordingly it is the object of the present invention to provide means for detecting the presence of either an intra-PABX call or an incoming trunk call received over a key telephone system line and provided a distinctive visual signal to indicate the characteristic of the incoming call.

SUMMARY OF THE INVENTION

In the present invention a standard key system telephone line circuit such as that manufactured by GTE Automatic Electric Incorporated and designated WA-1400D is provided with additional circuitry capable of distinguishing incoming ringing signals of a two second duration or incoming ringing signals consisting of two 500 millisecond rings with a 500 millisecond period of silence between the two rings. In each case the ringing signals are repeated on 6 second cycles.

The present circuitry times the duration of one and two ring signals. Ringing signals of a total duration of 1500 milliseconds or less are detected and a visual signal is provided to the lamps in associated key telephone subsets to indicate an incoming trunk call. In the case of ringing signals of 1500 to 2000 milliseconds duration, detection and display to the subset user provides an indication of a local intra-PABX call. Separation of the ring detection into two time periods (1–1500 milliseconds and 1500–2000 milliseconds) overcomes the possibility of false display due to random access of the interrupter circuitry provided with the PABX described above.

In the 10A2 Key Telephone System noted above and in most similar systems, three visual lamp conditions are provided at each key telephone subset that the user must be able to recognize. These include a BUSY indication which is shown as a steady lamp associated with the connected telephone line, a RING signal which is characterized by a visual flashing of the associated lamp at a rate of 60 flashes per minute and a HOLD signal which provides 120 flashes per minute. The present discrete ring detection circuitry adds a fourth lamp signal consisting of one short and one long lamp flash at a rate of 60 times per minute. The signal to the lamp that provides this latter special indication is derived fron standard interrupter circuitry by combining 60 flash per minute signals with 120 flash per minute signals.

BRIEF DESCRIPTION OF THE DRAWINGS

FIG. 2 shows the PABX ringing cycle waveforms associated with local and trunk calls.

FIG. 3 shows the waveforms associated with the various outputs of the interrupter unit provided with the key telephone system described and utilized in the present invention.

DESCRIPTION OF THE PREFERRED EMBODIMENT

Figure 1:
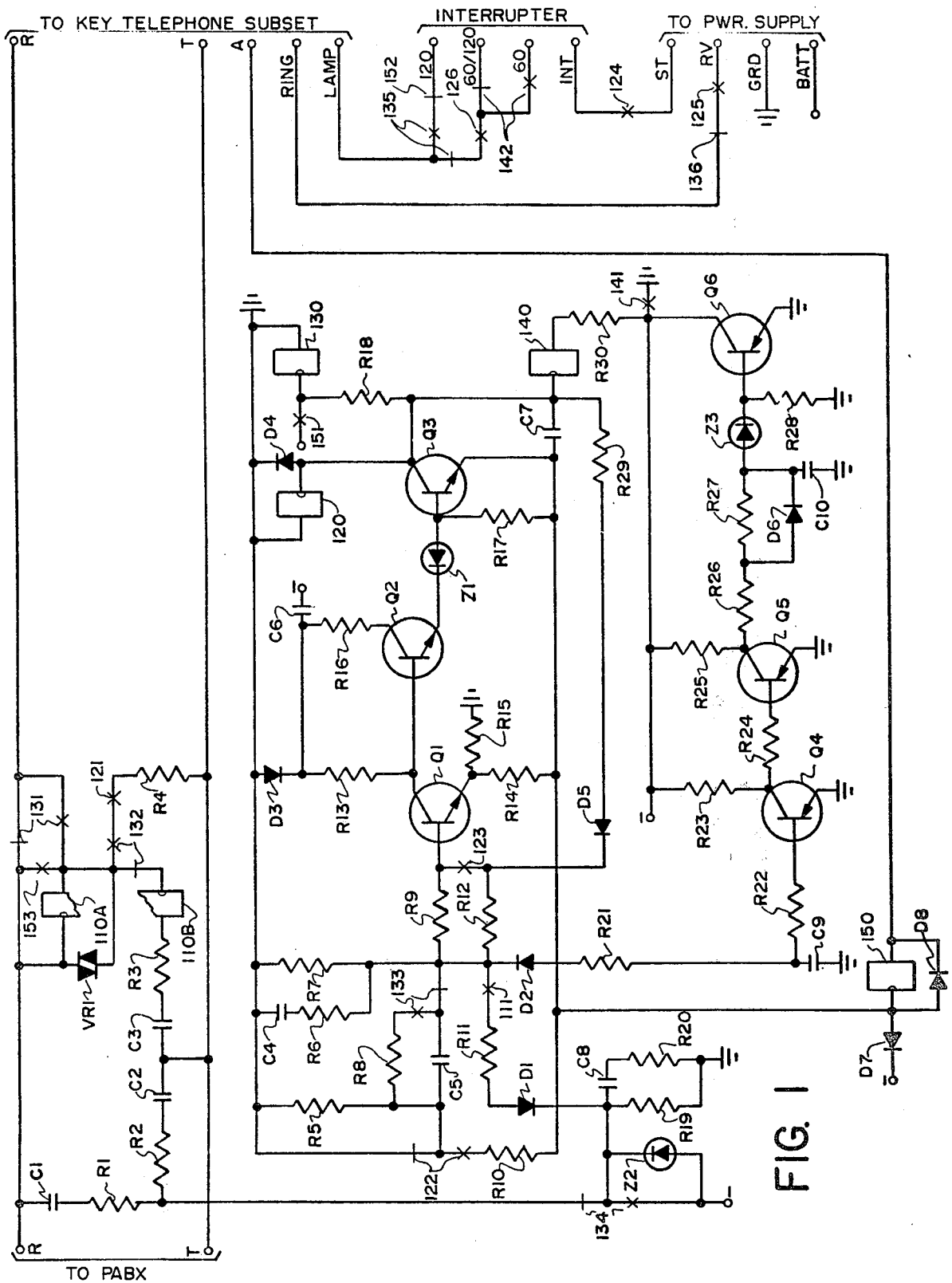
FIG. 1 of the drawings appended hereto is a schematic circuit diagram of a standard key system telephone line circuit modified to provide discrete detection of two different incoming ringing signals.

Referring now to the FIG. 1 of the accompanying drawing, the circuitry shown is similar to that of the standard WA-1400D line card manufactured by GTE Automatic Electric Incorporated and used in the 10A2 Key Telephone System manufactured by the same manufacturer. This line card provides for all the normal features of key telephone system lines and is similar in operation to those found in U.S. Pat. No. 3,816,670, issued to Richard A. Marshall, on June 11, 1974. The principal difference between the circuitry shown and that of standard key telephone line cards is the inclusion of the necessary circuitry for detection of incoming ringing signals of various types on a discrete basis.

As shown in FIG. 1 the present line circuitry connects at terminals T and R to the private automatic branch exchange. The talking path from the private automatic branch exchange is connected at terminals T' and R' to one or more associated key telephone subsets. Also connected to the associated key telephone subset are circuit conductors at terminals A, RING, and LAMP. Connected at terminals 120, 60/120, 60, and INT are circuit leads to an associated interrupter of conventional design. This interrupter is like that provided with the 10A2 key telephone systems described above and provides signaling pulses at appropriate rates for operation of the lamp circuitry associated with those key telephones connected to the line circuitry shown in FIG. 1. Those leads connected to terminals ST, RV, GRD, and BATT are connected to an associated power supply of conventional design which provides the necessary power for the subject line circuit as well as appropriate ringing voltage to operate the ringer included in one or more associated key telephone stations and a start lead for initiation of operation of the associated interrupter.

The circuitry added to the known line circuit includes relay 140, transistors Q4 through Q6 inclusive, and the associated resistors, capacitors, and diodes. For an understanding of the present invention a description of the operation of the line card circuitry as it pertains to the additional circuitry added for detection of discrete ring signals will be presented. Other details of the operation of the line circuit will not be treated inasmuch as they do not form a portion of the present invention.

Referring now to FIG. 1 partial operation of the basic line circuitry and complete operation of the discrete ring detector from the start of an incoming call until the called party answers or is timed out will be presented. Initially ringing current from the private automatic branch exchange is applied to terminals T and R. This ringing current signals the presence of an incoming call for a connected key telephone subset. In response to the incoming ringing signal relay 110 through its upper and lower windings 110A and 110B operates over a path from the PABX to terminal R through coil 110A, break contact 132, lower winding 110B, resistor R3, capacitor C3, and over the intervening conductors to terminal T and then returned to the private automatic branch exchange. The same ringing current is applied to capacitor C1 and C2 and resistors R1 and R2, through break contact 134, diode D1, and resistor R11, through operated contacts 111 associated with relay 110 and break contact 133 to capacitor C5. When capacitor C5 is charged to 18 volts, potential is available through resistor R9 at the base of transistor Q1, to turn normally operated transistor Q1 off. When transistor Q1 turns off transistor Q2 turns on. When transistor Q2 turns on, transistor Q3 likewise turns on to operate relay 120.

The operation of relay 120 at its associated contacts 124 provides power from the associated power supply to initiate operation of the associated interrupter. Placed in operation the interrupter provides 60 IPM lamp flashing signals to the associated key telephone subset. Contact 125 of relay 120 connects ringing voltage from the power supply to the subset ringer. Relay 120 remains operated until the called station is answered or until a time out occurs, if the incoming call is abandoned by the calling party.

The operation of relay 110 at contact 111 also closes a path to the discrete ring detector circuitry included and forming a portion of the present invention. Incoming ringing signals through diode D2 and resistors R21 and R22 are applied to the base of transistor Q4. The same ringing signal is also employed to charge capacitor C9 by negative half cycles and maintain a negative charge on the base of transistor Q4 during positive half cycles of the ringing current. Transistor Q4 turns on and applies a positive charge to the base of transistor Q5 via resistor R24. Transistor Q5 then turns off and allows capacitor C10 to start charging.

If the incoming ringing signal being received is of a 1500 millisecond or less duration, capacitor C10 will not charge to a level of 8.6 volts. Accordingly during the silent portion of the ring cycle transistor Q4 will turn off, with transistor Q5 turning on and capacitor C10 will by fully discharged. This cycle of charge and discharge of capacitor C10 continues for all rings received of 1500 or less milliseconds duration, with the voltage at zener diode Z3 never reaching 8.6 volts with respect to ground. Relay 140 thus will not operate on short rings. Relay 120 will apply an incoming trunk call signal (one short, one long flash per second) from terminals 60/120 through make contact 126 and break contact 135 to the lamp terminal which is connected to the associated key telephone subsets. At the associated key telephone subsets that lamp designated as associated with the subject line circuit will flash at the one short, one long flash per second rate.

When the duration of incoming ringing signal is 1500 to 2000 milliseconds long, capacitor C10 will charge to 8.6 volts. Zener diode Z3 will then apply this voltage to the base of transistor Q6. At this time transistor Q6 turns on and in turn operates relay 140. Relay 140 operates and locks up over its associated contacts 141, in parallel with relay 120 under control of transistor Q3. At contacts 142, relay 140 transfers the incoming flash signal extended to the associated subset from the lamp terminal, from the 60/120 to the 60 flash per minute incoming signal to indicate an incoming local intra-PABX call. When the call is answered or an abandoned call is timed out, transistor Q3 will release restoring both relays 120 and 140.

The ring detection circuitry of the line circuit and the discrete ringing detector of the present invention are both disabled after answer or time out. Complete release of the line circuit by both the central office and the station prepares the circuit for receipt of another call.

While but a single embodiment of the present invention has been shown it will be obvious to those skilled in the art that numerous modifications may be made without departing from the spirit and scope of the present invention which shall be limited only by the scope of the claims appended hereto.

What is claimed is:

1. A key telephone line circuit adapted for connection between a branch telephone exchange and at least one key telephone subset including signaling means, said line circuit further connected to a source of first and second signals and including ring detection means operable in response to incoming signals from said branch exchange representing a call originating in said branch telephone exchange to connect said first signals from said signal source to said key telephone signaling means whereby said signaling means are operated in a first distinctive mode and operable in response to incoming signals from said branch exchange representing a call originating outside said branch telephone exchange to connect said second signals from said signal source to said signaling means, whereby said signaling means are operated in a second distinctive mode, said ring detection means comprising: switching means normally completing a circuit path for said first signals from said signal source to said signaling means; and timing means connected between said branch exchange and said switching means operated in response to incoming signals received from said branch telephone exchange in excess of a predetermined minimum duration to operate said switching means to break said signal source first signal circuit path to said signaling means and complete a circuit path for said signal source second signals to said signaling means.

2. A key telephone line circuit as claimed in claim 1 wherein: said timing means include, a first capacitor, charged to a predetermined voltage level in response to incoming signals received from said branch exchange representing a call originating in said exchange; and said switching means operated in response to said capacitor being charged to said predetermined level.

3. A key telephone line circuit as claimed in claim 2 wherein: said timing means further include a first transistor connected between said capacitor and said switching means, said transistor operated in response to said capacitor being charged to said predetermined level to operate said switching means.

4. A key telephone line circuit as claimed in claim 3 wherein: said timing means further include a zener diode connected between said capacitor and said first transistor, said zener diode rendered conductive in response to said capacitor being charged to said predetermined level, to operate said first transistor.

5. A key telephone line circuit as claimed in claim 2 wherein: said timing means further include a second transistor connected to said first capacitor, said second transistor normally operated; and a third transistor connected between said branch exchange and said second transistor, said third transistor operated in response to incoming signals from said branch exchange representing an incoming call, said second transistor rendered non-conductive in response to said third transistor being operated, and said first capacitor charged in response to said second transistor being rendered non-conductive.

6. A key telephone line circuit as claimed in claim 5 wherein: said timing means further include a second capacitor including circuit connections to said third transistor and to said branch exchange, said second capacitor charged in response to said incoming signals to maintain said third transistor operated during alternate half cycles of said incoming signals.

7. A key telephone line circuit as claimed in claim 1 wherein: said switching means comprise a relay including an operating circuit connected to said timing means and a plurality of switching contacts connected between said signal source and said subset.

8. A key telephone line circuit as claimed in claim 7 wherein: said relay includes latching means operated in response to operation of said relay to retain said relay means operated and said latching means rendered inoperative and said relay restored in response to operation of said connected subset to answer an incoming call.

* * * * *